United States Patent
Bin Ismail et al.

(10) Patent No.: US 10,609,917 B2
(45) Date of Patent: Apr. 7, 2020

(54) DUAL-BEARING REEL

(71) Applicants: Shimano Components (Malaysia) SDN. BHD., Pontian, Johor (MY); Shimano Inc., Sakai, Osaka (JP)

(72) Inventors: Mohd Syamsul Johary Bin Ismail, Johor (MY); Abu Supian Bin Ahmad, Johor (MY); Keigo Kitajima, Sakai (JP); Baihaki Bin Sabtu, Johor (MY); Muhd Syukri Nazry Bin Mustapha, Johor (MY)

(73) Assignees: SHIMANO COMPONENTS (MALAYSIA) SDN. BHD., Pontian, Johor (MY); SHIMANO INC., Sakai, Osaka (JP)

( * ) Notice: Subject to any disclaimer, the term of this patent is extended or adjusted under 35 U.S.C. 154(b) by 0 days.

(21) Appl. No.: 16/356,795

(22) Filed: Mar. 18, 2019

(65) Prior Publication Data
US 2019/0327947 A1 Oct. 31, 2019

(30) Foreign Application Priority Data
Apr. 26, 2018 (JP) ................. 2018-085820

(51) Int. Cl.
*A01K 89/01* (2006.01)
*A01K 89/015* (2006.01)

(52) U.S. Cl.
CPC .... *A01K 89/0193* (2015.05); *A01K 89/01902* (2015.05)

(58) Field of Classification Search
CPC ............ A01K 89/0186; A01K 89/0189; A01K 89/01901; A01K 89/01902; A01K 89/0191; A01K 89/0193; A01K 89/01931
See application file for complete search history.

(56) References Cited

U.S. PATENT DOCUMENTS

| | | | | |
|---|---|---|---|---|
| 5,855,330 A | * | 1/1999 | Kobayashi | A01K 89/01901 242/261 |
| 5,904,310 A | * | 5/1999 | Miyazaki | A01K 89/0186 242/260 |
| 6,189,823 B1 | * | 2/2001 | Kobayashi | A01K 89/01921 242/312 |
| 6,199,782 B1 | * | 3/2001 | Oishi | A01K 89/01921 242/312 |

(Continued)

FOREIGN PATENT DOCUMENTS

JP 2009-038978 A 2/2009
JP 2015-163055 A 9/2015

*Primary Examiner* — Emmanuel M Marcelo
(74) *Attorney, Agent, or Firm* — United IP Counselors, LLC (57) ABSTRACT

A dual-bearing reel is disclosed. The dual-bearing reel includes a metal frame, a pinion gear, a bearing, a clutch member, and a clutch supporting member made of resin. The metal frame supports a handle shaft. The pinion gear is configured to transmit the rotation of the handle shaft to a spool shaft. The bearing rotatably supports the pinion gear. The clutch member is used for switching the spool shaft and the pinion gear between a coupled state and a decoupled state. The resin clutch supporting member is fixed to the frame. The clutch supporting member supports the clutch member. The clutch supporting member includes a bearing support part for supporting the bearing.

8 Claims, 5 Drawing Sheets

(56) References Cited

U.S. PATENT DOCUMENTS

| | | | |
|---|---|---|---|
| 7,789,336 B1* | 9/2010 | Nakagawa | A01K 89/01931 242/322 |
| 2002/0063181 A1* | 5/2002 | Yamaguchi | A01K 89/0155 242/286 |
| 2007/0007377 A1* | 1/2007 | Miyazaki | A01K 89/033 242/245 |
| 2013/0153700 A1* | 6/2013 | Niitsuma | A01K 89/0186 242/310 |
| 2013/0193250 A1* | 8/2013 | Ikebukuro | A01K 89/01903 242/261 |
| 2015/0115087 A1* | 4/2015 | Ohara | F16C 32/0406 242/223 |
| 2015/0122930 A1* | 5/2015 | Ohara | F16C 33/765 242/321 |
| 2015/0181853 A1* | 7/2015 | Niitsuma | A01K 89/015 242/257 |

\* cited by examiner

DUAL-BEARING REEL

CROSS-REFERENCE TO RELATED APPLICATIONS

This application claims priority to Japanese Patent Application No. 2018-085820, filed Apr. 26, 2018. The contents of that application are incorporated by reference herein in their entirety.

BACKGROUND

Technical Field

The present disclosure relates to a dual-bearing reel.

Background Information

A conventional dual-bearing reel includes a metal frame, a pinion gear, and a clutch supporting member (clutch guard) made of resin (refer to Japanese Laid-open Patent Application Publication No. 2009-038978 and Japanese Laid-open Patent Application Publication No. 2015-163055). The frame includes a bearing for supporting the pinion gear. The pinion gear is configured to transmit the rotation of a handle shaft to a spool shaft.

The resin clutch supporting member supports a clutch member (clutch cam or clutch plate). The clutch member is used for switching the spool shaft and the pinion gear between a coupled state and a decoupled state. The resin clutch supporting member is attached to the frame and disposed between the clutch member and the frame.

BRIEF SUMMARY

In a conventional dual-bearing reel, a pinion gear is supported by a bearing located on a frame. A clutch member is supported by a clutch supporting member, and the clutch supporting member is attached to the frame.

In this case, when a misalignment occurs in attaching the clutch supporting member to the frame, a deviation also occurs in a positional relationship between the bearing on the frame and the clutch member supported by the clutch supporting member. That is, the positional relationship between the pinion gear and the clutch member changes. In short, there is a possibility that the coupling and decoupling between a spool shaft and the pinion gear cannot be performed smoothly by the clutch member.

The present disclosure has been made in view of the aforementioned drawback, and an object of the present disclosure is to provide a dual-bearing reel having improved positional accuracy of a clutch member and a pinion gear of the reel.

A dual-bearing reel according to one aspect of the present disclosure includes a metal frame, a pinion gear, a bearing, a clutch member, and a clutch supporting member made of resin.

The metal frame supports a handle shaft. The pinion gear is configured to transmit a rotation of the handle shaft to a spool shaft. The bearing rotatably supports the pinion gear. The clutch member is used for switching the spool shaft and the pinion gear between a coupled state and a decoupled state. The clutch supporting member is attached to the frame. The clutch supporting member supports the clutch member. The clutch supporting member has a bearing support part for supporting the bearing.

In the present dual-bearing reel, the clutch supporting member is attached to the frame. The clutch supporting member supports the clutch member, and the bearing support part of the clutch supporting member supports the pinion gear via the bearing. In this way, the clutch supporting member supports both the clutch member and the pinion gear.

That is, as compared with the prior art in which a clutch supporting member supports a clutch member and a frame supports a pinion gear, the positional accuracy of the clutch member and the pinion gear can be improved in the present dual-bearing reel. Furthermore, improving the positional accuracy of the clutch member and the pinion gear enables smooth coupling and decoupling between the spool shaft and the pinion gear.

In the dual-bearing reel according to another aspect of the present disclosure, preferably, the clutch supporting member includes a main body part and a protruding part. In this case, the main body part is attached to the frame. The protruding part protrudes from the main body part towards the frame. The protruding part has an inner peripheral surface formed to be larger in diameter than the pinion gear. The bearing support part is located radially outward than the inner peripheral surface of the protruding part.

In this configuration, a stepped portion can be located between the bearing support part and the protruding part, whereby the position of the bearing is determined by this stepped portion. As a result, the positional accuracy of the pinion gear with respect to the bearing support part can be improved.

In the dual-bearing reel according to yet another aspect of the present disclosure, the protruding part preferably has a cylindrical shape. In this case, an outer peripheral portion of the protruding part is fitted into a through hole disposed in the frame. With this configuration, the clutch supporting member can be attached to the frame with high accuracy.

According to the present disclosure, it is possible to improve the positional accuracy of the clutch member and the pinion gear in the dual-bearing reel.

BRIEF DESCRIPTION OF THE DRAWINGS

Referring now to the attached drawings which form a part of this original disclosure.

DETAILED DESCRIPTION

Figure 1:
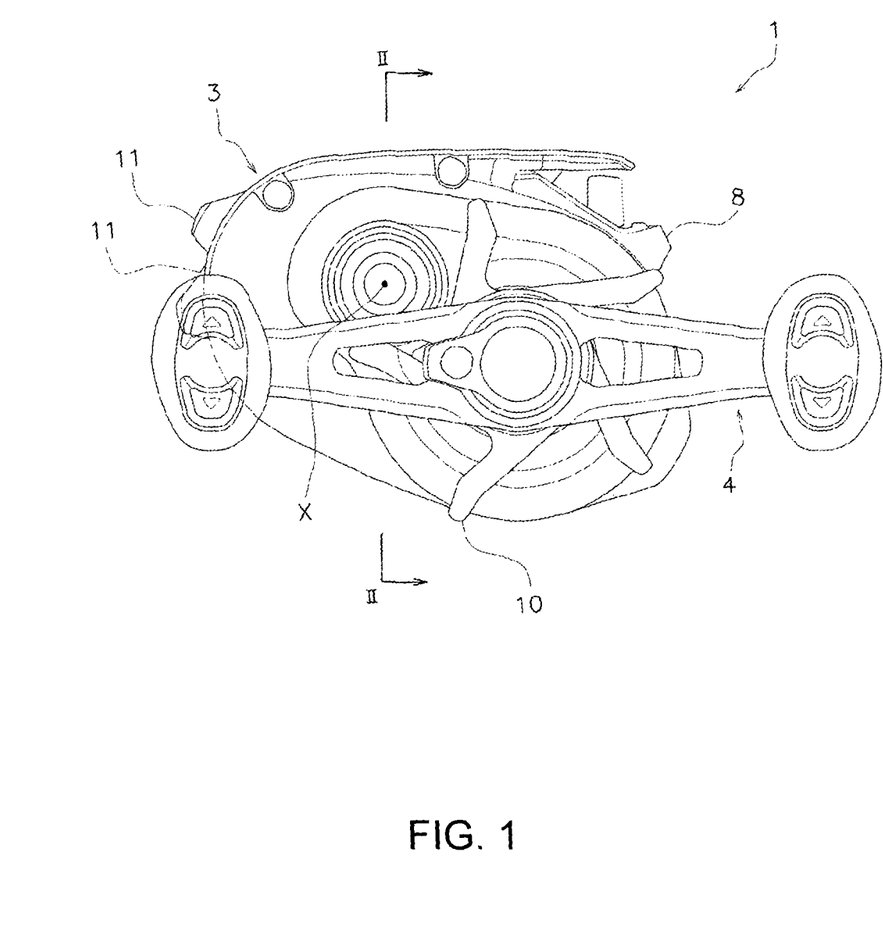
FIG. 1 is a side view of a dual-bearing reel of an embodiment of the present disclosure.
Figure 2:
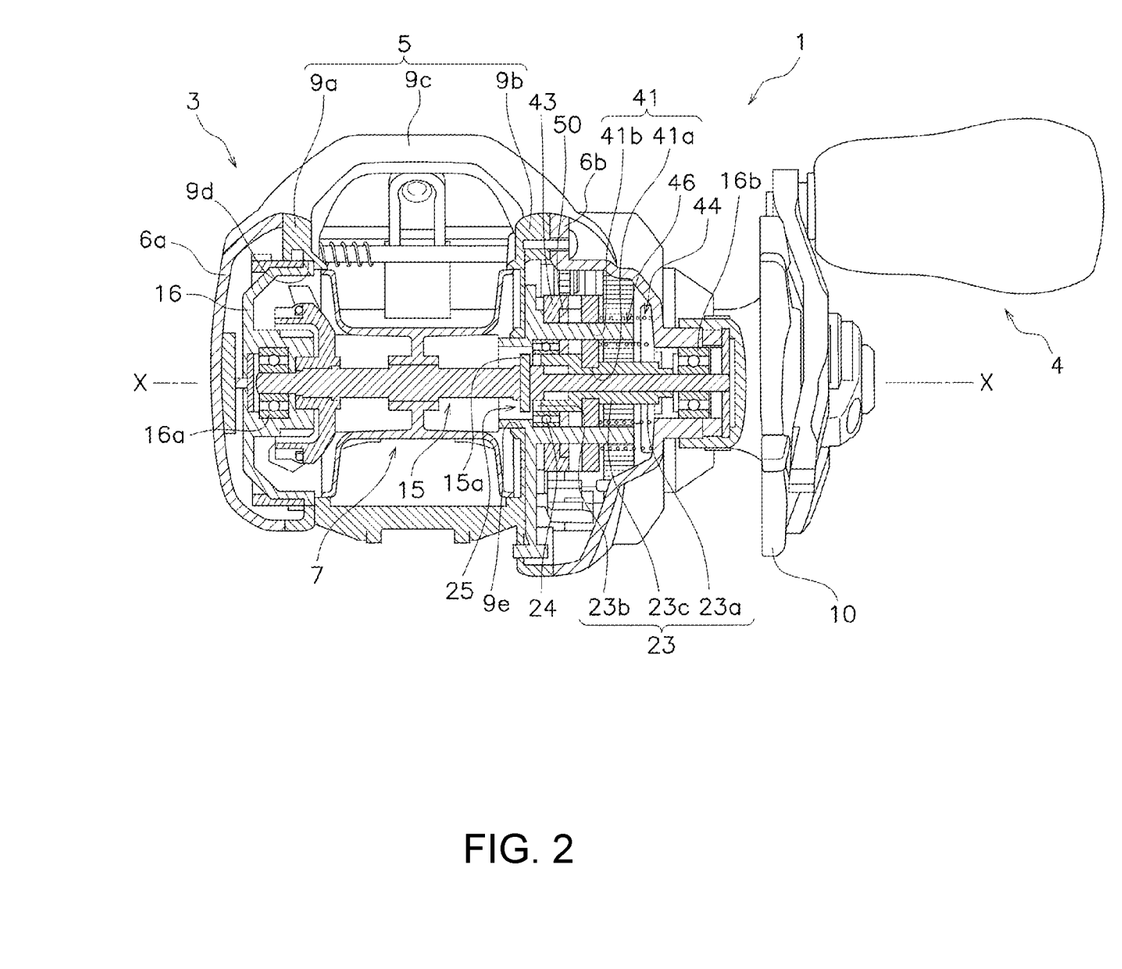
FIG. 2 is a cross-sectional view of the dual-bearing reel taken along the section line II-II of FIG. 1.

As illustrated in FIG. 1, a dual-bearing reel 1 of one embodiment of the present disclosure includes a reel body 3 that is mountable on a fishing rod, a handle 4 disposed on a side of the reel body 3 for rotating a spool, and a spool 7 (refer to FIG. 2) rotatably mounted on the reel body 3. As illustrated in FIG. 2, the dual-bearing reel 1 further includes a clutch mechanism 25 capable of coupling the handle 4 to the spool 7 and decoupling the handle 4 from the spool 7.

It should be noted that in the following description, the rotational axis of the spool 7 is referred to as a "spool axis X." Also, the term "spool shaft direction" indicates an extending direction of the spool axis X and a direction along the spool axis x, whereas the term "circumferential direction" (rotational direction) indicates a circumferential direction about the spool axis X. Also, the term "radial direction" indicates a direction away from the spool axis X with the spool axis X as the center.

<Reel Body>

As illustrated in FIG. 2, the reel body 3 includes a frame 5 made of metal, a first side cover 6a and a second side cover 6b, which are mounted to cover both sides of the frame 5, and a front cover 8 (refer to FIG. 1) mounted on the front of the frame 5.

Figure 3:
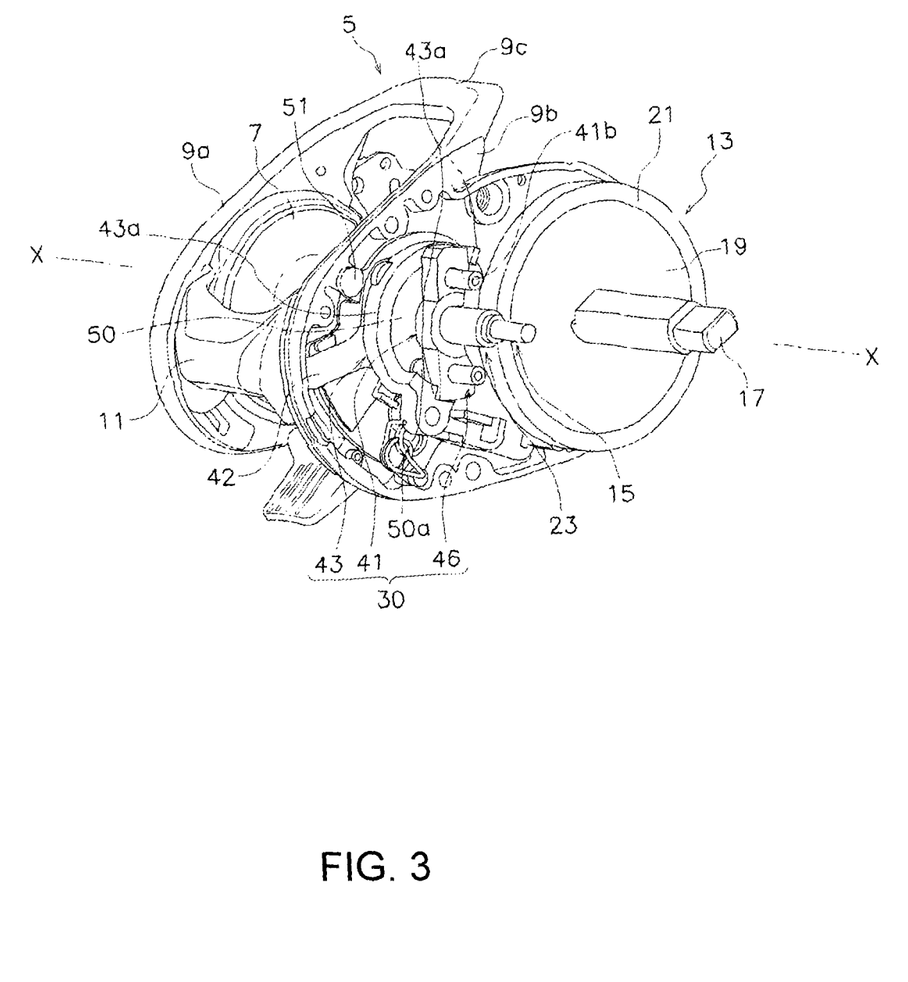
FIG. 3 is a perspective view of a clutch controller disposed in a frame of the dual-bearing reel.

The frame 5 supports a handle shaft 17 (refer to FIG. 3). The frame 5 includes a first side plate 9a and a second side plate 9b which are disposed opposite to each other with an interval between them. The first side plate 9a and the second side plate 9b are coupled to each other through a coupling part 9c.

The first side plate 9a has a first opening 9d. A bearing accommodating part 16 is fixed to the first opening 9d. A clutch controller 30 (refer to FIG. 3) is mounted on the second side plate 9b. The second side plate 9b has a second opening 9e through which a spool shaft 15 passes. The first side cover 6a is attached to the first side plate 9a of the frame 5. The second side cover 6b is attached to the second side plate 9b of the frame 5.

As illustrated in FIG. 3, the spool 7 and a clutch operating member 11 are disposed in the frame 5, for example, between the first side plate 9a and the second side plate 9b. Furthermore, for example, a rotation transmission mechanism 13 and the clutch controller 30 are disposed between the frame 5 and the second side cover 6b (refer to FIG. 2). That is, the dual-bearing reel 1 further includes the clutch operating member 11, the rotation transmission mechanism 13, and the clutch controller 30.

<Spool>

As illustrated in FIGS. 2 and 3, the spool 7 is rotatably disposed between the first side plate 9a and the second side plate 9b. The spool 7 is attached to the spool shaft 15 so as to be integrally rotatable with the spool shaft 15.

The spool shaft 15 is rotatable with respect to the reel body 3. For example, as illustrated in FIG. 2, one end portion of the spool shaft 15 is rotatably supported with respect to the first side plate 9a via a bearing 16a disposed in the bearing accommodating part 16. The other end portion of the spool shaft 15 is rotatably supported with respect to the second side plate 9b via a bearing 16b. An engaging pin 15a constituting the clutch mechanism 25 is attached to the spool shaft 15.

<Clutch Operating Member>

As illustrated in FIGS. 1 and 3, the clutch operating member 11 is disposed at the rear part of the reel body 3. The clutch operating member 11 is coupled to the clutch controller 30. The clutch operating member 11 is movable between a clutch ON position (refer to the solid line in FIG. 1) and a clutch OFF position (refer to the broken line in FIG. 1). The clutch operating member 11 is also used as a thumb rest for thumbing.

<Rotation Transmission Mechanism>

The rotation transmission mechanism 13 is a mechanism for transmitting the rotational force from the handle 4 to the spool 7. As illustrated in FIG. 3, for example, the rotation transmission mechanism 13 includes a handle shaft 17, a drag mechanism 19, a drive gear 21, and a pinion gear 23 (refer to FIG. 2).

The handle 4 is mounted on the handle shaft 17. The handle shaft 17 is rotatably supported by the metal frame 5. More specifically, the handle shaft 17 is rotatably supported by the second side cover 6b and the metal frame 5. For example, the handle shaft 17 is rotatably supported by the second side cover 6b via a one-way clutch (not shown) that prevents the handle shaft 17 from rotating in a line releasing direction. In addition, the handle shaft 17 is rotatably supported by the second side plate 9b via a bearing (not shown).

The drag mechanism 19 transmits the rotation of the handle shaft 17 to the drive gear 21 and applies a brake to the rotation of the spool 7 at the time of line release. As illustrated in FIG. 3, the drag mechanism 19 is disposed between the handle shaft 17 and the drive gear 21.

The drive gear 21 is rotatably mounted on the handle shaft 17. As illustrated in FIG. 3, the rotation of the handle shaft 17 is transmitted to the drive gear 21 via the drag mechanism 19. In this embodiment, a helical gear is used as the drive gear 21. Further, when a torque of a predetermined value or more acts on the spool 7 at the time of line release, the drag mechanism 19 operates and the drive gear 21 rotates relative to the handle shaft 17.

The pinion gear 23 is configured to transmit the rotation of the handle shaft 17 to the spool shaft 15. More specifically, the pinion gear 23 transmits the rotation of the drive gear 21, which integrally rotates with the handle shaft 17, to the spool shaft 15.

As illustrated in FIG. 2, the pinion gear 23 has a substantially tubular shape. The pinion gear 23 is disposed radially outward of the spool shaft 15 so as to be movable in the spool shaft direction with respect to the spool shaft 15.

The pinion gear 23 is disposed between the spool shaft 15 and a clutch supporting member 46 in the radial direction. A bearing 24 is disposed between the pinion gear 23 and the clutch supporting member 46. The pinion gear 23 is rotatably supported with respect to the clutch supporting member 46 via the bearing 24. The clutch supporting member 46 is an example of a clutch supporting means.

The pinion gear 23 includes a helical toothed part 23a, an engagement groove 23b, and a small diameter part 23c. The toothed part 23a meshes with the drive gear 21. The engagement groove 23b is formed at an end portion of the pinion gear 23 and extends in the radial direction. The outer peripheral surface of the cylindrical portion where the engagement groove 23b is formed is supported by the clutch supporting member 46 via the bearing 24. The small diameter part 23c is formed between the toothed part 23a and the engagement groove 23b. A clutch yoke 41 (refer to FIG. 3) is engaged with the small diameter part 23c.

<Clutch Mechanism>

The clutch mechanism 25 is configured to couple the handle 4 and the spool 7 with each other and to decouple the handle 4 and the spool 7 from each other. As illustrated in FIG. 2, the clutch mechanism 25 is composed of the engagement groove 23b of the pinion gear 23 and the engaging pin 15a of the spool shaft 15.

For example, when the pinion gear 23 moves in a direction away from the spool 7 along the spool shaft 15 whereby the engagement groove 23b and the engaging pin 15a of the spool shaft 15 are disengaged, the clutch mechanism 25 is brought into the clutch OFF state (decoupled state). In this state, the spool 7 becomes freely rotatable.

On the other hand, when the pinion gear 23 moves in a direction approaching the spool 7 along the spool shaft 15 whereby the engagement groove 23b is engaged with the engaging pin 15a, the clutch mechanism 25 is brought into the clutch ON state (coupled state). In this state, the spool 7 rotates in conjunction with the rotation of the handle shaft 17.

<Clutch Controller>

The clutch controller 30 is configured to control the clutch mechanism 25 according to an operation of the clutch operating member 11. As illustrated in FIG. 3, the clutch controller 30 includes the clutch yoke 41, a clutch cam 43 (an example of a clutch member), and the clutch supporting member 46 made of resin.

(Clutch Yoke)

The clutch yoke 41 is for switching the clutch mechanism 25 between the clutch ON state and the clutch OFF state. As illustrated in FIGS. 2 and 3, the clutch yoke 41 is guided in the spool shaft direction by the clutch cam 43 and a support part 47.

As illustrated in FIG. 2, the clutch yoke 41 includes an engagement recess 41a that is engageable with the pinion gear 23 and a pair of guide holes 41b. The engagement recess 41a is engageable with the small diameter part 23c of the pinion gear 23.

The pair of guide holes 41b penetrate the clutch yoke 41 in the spool shaft direction. A guide support 48 (to be described) is inserted through each guide hole 41b. Both end portions of the clutch yoke 41 are engaged with the clutch cam 43.

(Clutch Cam)

The clutch cam 43 is used for switching the spool shaft 15 and the pinion gear 23 between the coupled state and the decoupled state. More specifically, the clutch cam 43 moves the clutch yoke 41 in the spool shaft direction. The spool shaft 15 and the pinion gear 23 are switched between the coupled state and the decoupled state by the movement of the clutch yoke 41.

As illustrated in FIGS. 2 and 3, the clutch cam 43 is disposed on the clutch supporting member 46 so as to be rotatable around the spool axis X. A coupling member 42 is attached to the clutch cam 43. The coupling member 42 couples the clutch operating member 11 and the clutch cam 43 with each other. Upon operation of the clutch operating member 11, the clutch cam 43 rotates via the coupling member 42.

Figure 4:
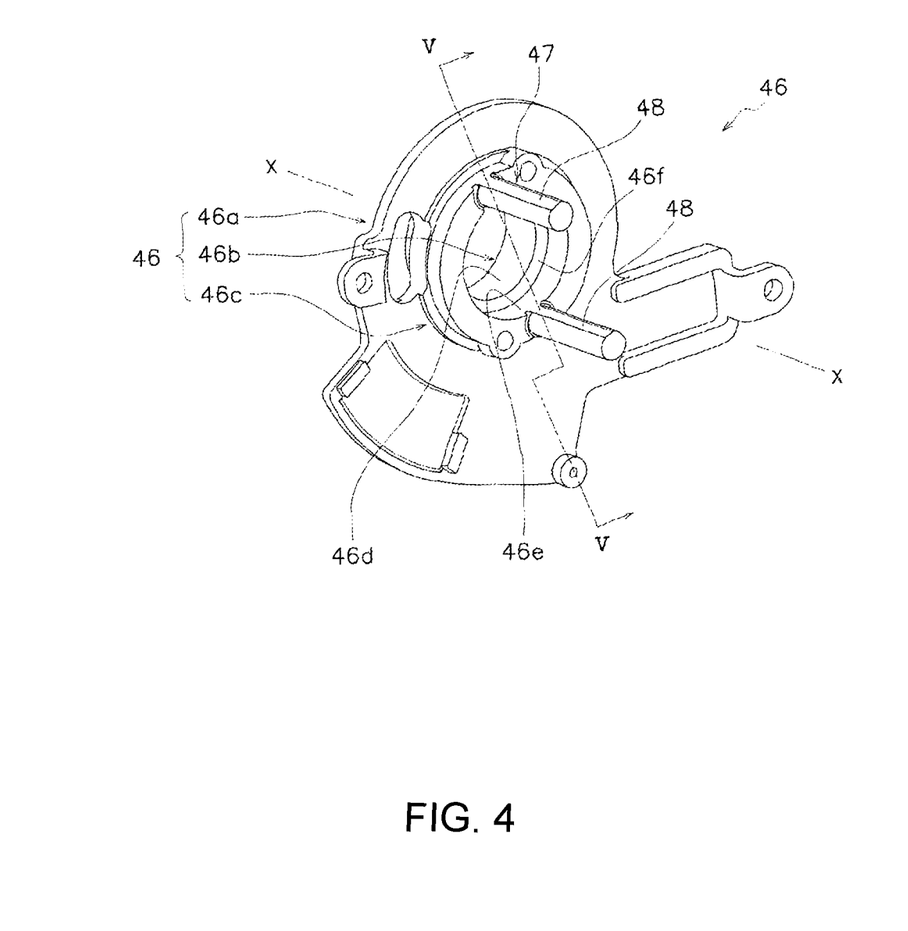
FIG. 4 is a perspective view of a clutch supporting member.
Figure 5:
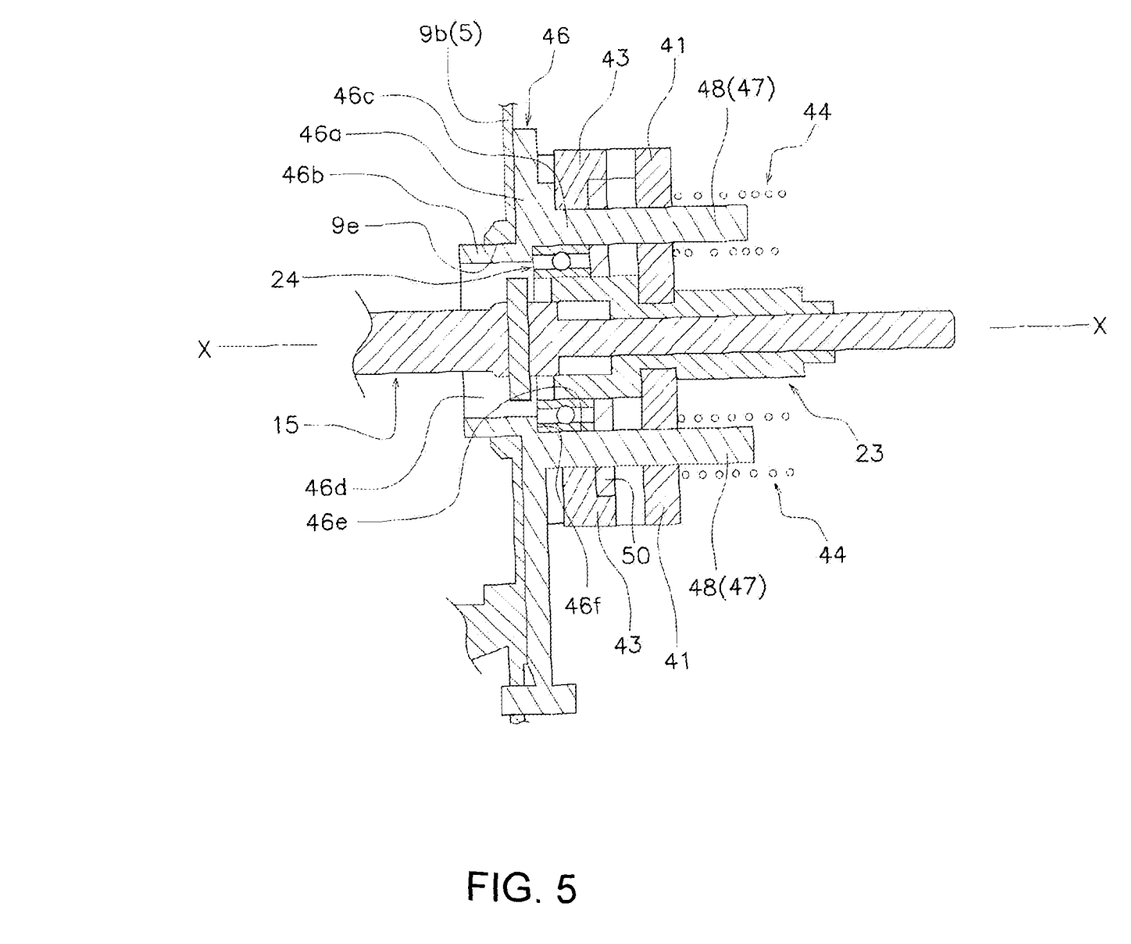
FIG. 5 is a cross-sectional view of the clutch supporting member taken along the section line V-V in FIG. 4.

As illustrated in FIGS. 4 and 5, the clutch cam 43 is disposed on an outer peripheral side of a bearing support part 46c (to be described) of the clutch supporting member 46 and is rotatable around the bearing support part 46c. As illustrated in FIGS. 3 and 5, the position of the clutch cam 43 is determined in the axial direction by a positioning member 50. The positioning member 50 is fixed to the second side plate 9b by a fixing member, for example, a screw member 50a.

The clutch cam 43 includes a cam portion 43a for guiding the clutch yoke 41 in the axial direction. When the clutch cam 43 is rotated by the operation of the clutch operating member 11, the cam portion 43a presses both end portions of the clutch yoke 41. Then, both end portions of the clutch yoke 41 move in the spool shaft direction away from the spool 7. As a result, the clutch mechanism 25 is switched from the clutch ON state to the clutch OFF state.

On the other hand, when a clutch returning mechanism (not shown) is operated by the operation of the handle 4, the clutch cam 43 rotates in a direction opposite to the above-mentioned rotating direction. Then, both end portions of the clutch yoke 41 move in the spool shaft direction approaching the spool 7. As a result, the clutch mechanism 25 is switched from the clutch OFF state to the clutch ON state.

(Clutch Supporting Member)

As illustrated in FIG. 3, the clutch supporting member 46 supports the clutch cam 43. The clutch supporting member 46 includes the bearing support part 46c for supporting the bearing 24. More specifically, as illustrated in FIGS. 4 and 5, the clutch supporting member 46 includes a main body part 46a, a protruding part 46b, and the bearing support part 46c.

It is to be noted that shown here is an example of the bearing support part 46c configured to have a different structure from the main body part 46a and the protruding part 46b; however, a configuration can be adopted in which the bearing support part 46c is partially or entirely included in the main body part 46a and/or the protruding part 46b.

As illustrated in FIG. 5, the main body part 46a is attached to the frame 5. The main body part 46a is disposed between the frame 5 and the clutch cam 43. The main body part 46a is fixed to the frame 5, for example, the second side plate 9b by a fixing means such as a screw member 51 (refer to FIG. 3). As a result, the clutch supporting member 46 is positioned in the spool shaft direction.

As shown in FIGS. 4 and 5, the protruding part 46b protrudes from the main body part 46a toward the frame 5. The protruding part 46b is integrally formed with the main body part 46a. The protruding part 46b has a cylindrical shape. The protruding part 46b has an inner peripheral surface 46d formed to be larger in diameter than the pinion gear 23. The pinion gear 23 is disposed radially inward of the inner peripheral surface 46d.

As shown in FIG. 5, the outer peripheral portion of the protruding part 46b is fitted into a through hole located in the frame 5, for example, the second opening 9e provided in the second side plate 9b. As a result, the position of the clutch supporting member 46 is determined in the radial direction.

As illustrated in FIG. 5, the bearing support part 46c is a part that supports the bearing 24. The bearing support part 46c is located radially outward than the inner peripheral surface 46d of the protruding part 46b. More specifically, the bearing support part 46c is integrally formed with the main body part 46a. The bearing support part 46c has a cylindrical shape. The clutch cam 43 is disposed on the outer peripheral portion of the bearing support part 46c.

The bearing support part 46c has an inner peripheral surface 46e that supports the bearing 24. For example, the inner peripheral surface 46e of the bearing support part 46c supports an outer ring of the bearing 24. The inner peripheral surface 46e of the bearing support part 46c is larger in diameter than the inner peripheral surface 46d of the protruding part 46b. An annular stepped portion 46f is disposed between the inner peripheral surface 46d of the protruding part 46b and the inner peripheral surface 46e of the bearing support part 46c. The stepped portion 46f supports the bearing 24, for example, the outer ring of the bearing 24, in the spool shaft direction.

As illustrated in FIGS. 4 and 5, the clutch supporting member 46 includes a support part 47. The support part 47 guides the clutch yoke 41 in the spool shaft direction. The support part 47 includes a pair of guide supports 48 protruding from the clutch supporting member 46 (for example, the bearing support part 46c).

The pair of guide supports 48 is integrally formed with the clutch supporting member 46, for example, the bearing support part 46c. The pair of guide supports 48 respectively protrudes from the bearing support part 46c in the spool shaft direction. The pair of guide supports 48 is disposed at an interval from each other in the circumferential direction.

As illustrated in FIG. 3, the pair of guide supports 48 is inserted through the pair of guide holes 41b of the clutch yoke 41. In this state, a coil spring 44 is disposed around each guide support 48 (refer to FIGS. 2 and 5). For example, the coil spring 44 is disposed around each guide support 48 in a compressed state between the clutch yoke 41 and the second side cover 6b.

For example, when the clutch mechanism 25 is set in the clutch ON state and the clutch cam 43 is rotated by the operation of the clutch operating member 11, the clutch yoke 41 is guided by the pair of guide supports 48 and moves in the spool shaft direction away from the spool 7. As a result, the clutch mechanism 25 is switched from the clutch ON state to the clutch OFF state.

On the other hand, when the clutch returning mechanism (not shown) is operated by the operation of the handle 4, the clutch yoke 41 is urged by the coil spring 44 to move along the pair of guide supports 48 in the spool shaft direction approaching the spool 7. As a result, the clutch mechanism 25 returns from the clutch OFF state to the clutch ON state.

In the dual-bearing reel 1 described above, the clutch supporting member 46 is attached to the frame 5. The clutch supporting member 46 supports the clutch cam 43, and the bearing support part 46c of the clutch supporting member 46 supports the pinion gear 23 via the bearing 24. In this way, the clutch supporting member 46 supports both the clutch cam 43 and the pinion gear 23.

As a result, as compared with the prior art in which the clutch supporting member 46 supports the clutch cam 43 and the frame 5 supports the pinion gear 23, the positional accuracy of the clutch cam 43 and the pinion gear 23 can be improved in the dual-bearing reel 1 described above. Furthermore, improving the positional accuracy of the clutch cam 43 and the pinion gear 23 allows the pinion gear 23 to be accurately moved by the clutch yoke 41, thereby making it possible to smoothly couple and decouple the spool shaft 15 and the pinion gear 23.

<Other Embodiments>

One embodiment of the present disclosure has been described above; however, the present disclosure is not limited to the above embodiment, and various modifications can be made without departing from the scope of the present disclosure.

(a) The aforementioned embodiment has exemplified the case where the pinion gear 23 is moved in the spool shaft direction using the clutch cam 43 and the clutch yoke 41. Alternatively, the pinion gear 23 can be moved in the spool shaft direction by using a mechanism different from the clutch cam 43 and the clutch yoke 41.

(b) The aforementioned embodiment has exemplified the case where the support part 47 is integrally formed with the clutch supporting member 46; however, the support part 47 can be separately provided from the clutch supporting member 46. For example, when the support part 47 is separately provided from the clutch supporting member 46, the support part 47 can be integrally formed with the frame 5.

REFERENCE SIGNS LIST

1: dual-bearing reel, 3: reel body, 4: handle, 5: frame, 7: spool, 15: spool shaft, 17: handle shaft, 24: bearing, 41: clutch yoke, 43: clutch cam, 46: clutch supporting member, 47: support part, 46a: main body part, 46b: protruding part, 46c: bearing support part, 46d: inner peripheral surface

What is claimed is:

1. A dual-bearing reel, comprising:
a metal frame configured to support a handle shaft;
a pinion gear configured to transmit rotation of the handle shaft to a spool shaft;
a bearing configured to rotatably support the pinion gear;
a clutch member configured to switch the spool shaft and the pinion gear between a coupled state and a decoupled state; and
a clutch supporting member configured to support the clutch member,
the clutch supporting member made of resin and attached to the frame,
the clutch supporting member including a bearing support part that supports the bearing, and
the clutch supporting member configured to regulate the bearing from moving toward the frame in an axial direction.

2. The dual-bearing reel according to claim 1, wherein
the clutch supporting member further includes a main body part attached to the frame and a protruding part protruding from the main body part toward the frame and having an inner periphery formed to be larger in diameter than the pinion gear, and
the bearing support part is located radially outward than the inner periphery of the protruding part.

3. The dual-bearing reel according to claim 2, wherein
the protruding part has a cylindrical shape and
an outer periphery of the protruding part is fitted into a through hole located in the frame.

4. The dual-bearing reel according to claim 2, wherein
the clutch supporting member further includes a stepped portion disposed between the inner periphery of the protruding part and an inner periphery of the bearing support part.

5. The dual-bearing reel according to claim 2, wherein
the main body part is disposed between the frame and the clutch member.

6. The dual-bearing reel according to claim 1, wherein
the clutch member is disposed on an outer periphery of the bearing support part.

7. The dual-bearing reel according to claim 1, wherein
the bearing support part prevents the bearing from contacting the frame.

8. A dual-bearing reel, comprising:
a metal frame configured to support a handle shaft;
a pinion gear configured to transmit rotation of the handle shaft to a spool shaft;
a bearing configured to rotatably support the pinion gear;
a clutch member configured to switch the spool shaft and the pinion gear between a coupled state and a decoupled state; and
a clutch supporting member configured to support the clutch member,
the clutch supporting member made of resin and attached to the frame,
the clutch supporting member including a bearing support part that supports the bearing,
the clutch supporting member further including a main body part attached to the frame and a protruding part protruding from the main body part toward the frame and having an inner periphery formed to be larger in diameter than the pinion gear, and
the bearing support part located radially outward than the inner periphery of the protruding part.

* * * * *